United States Patent [19]

Takikawa

[11] Patent Number: 4,725,906
[45] Date of Patent: Feb. 16, 1988

[54] DISK RECORDING-REPRODUCING DEVICE

[75] Inventor: Makito Takikawa, Furukawa, Japan

[73] Assignee: Alps Electric Co. Ltd., Tokyo, Japan

[21] Appl. No.: 839,705

[22] Filed: Mar. 13, 1986

[30] Foreign Application Priority Data

Mar. 13, 1985 [JP] Japan .................................. 60-49904

[51] Int. Cl.⁴ ............................................ G11B 17/032
[52] U.S. Cl. ........................................................ 360/97
[58] Field of Search .................... 360/97, 99; 369/77.1, 369/270, 261

[56] References Cited

U.S. PATENT DOCUMENTS

| | | | |
|---|---|---|---|
| 4,179,718 | 12/1979 | Rolph | 360/99 |
| 4,485,464 | 11/1984 | Shimoaka | 360/97 |
| 4,587,586 | 5/1986 | Hamanaka | 360/99 |
| 4,614,988 | 9/1986 | Mahnke | 360/99 |

Primary Examiner—John H. Wolff
Assistant Examiner—Matthew J. Bussan
Attorney, Agent, or Firm—Guy W. Shoup

[57] ABSTRACT

A disk recording-reproducing device of the type wherein in response to open/close action of a door the clamp operation against a disk is commenced, which is characterized by a door plate provided on its front end with the door and urged toward the door, a rotary frame supporting slidably the door plate and urged rotatably in the open direction of the door, and a lock plate formed with a notch engagable with a lock portion provided on the door plate at the close time of the door and urged in the engaging direction, whereby a force caused by door opening and locking is not applied unduly to a front panel of the device.

1 Claim, 6 Drawing Figures

DISK RECORDING-REPRODUCING DEVICE

BACKGROUND OF THE INVENTION

1. Field of the Invention

This invention relates to a disk recording-reproducing device used in computers, word processors, etc. for recording information magnetically on a recording surface of a disk and reproducing the same and, more particularly, to a door open/close mechanism.

2. Description of the Prior Art

U.S. Pat. No. 4,485,464 discloses one configuration of the door open/close mechanism usable in the disk recording-reproducing device, which is illustrated in FIGS. 4, 5(a) and 5(b). In these drawings, reference numeral 40 indicates a door made of synthetic resin which is composed of an L-shaped control portion 41 and attaching portion 42, with the control portion 41 having on either side a projection 43 to give discrete action to the door open/close operation. The attaching portion 42 is provided with an opening 45 accommodating a coil spring 44 for urging the door 40 and a projection holding one end of the coil spring 44. 47 indicates a rotary frame made of metal plate which supports the door 40 and a disk holding member 48. The rotary frame 47 is provided with a pivot supporting portion 49, opening 50, arm portion 51, door accommodating portion 52, pair of pushing segments 53, 53, and attaching portion 55 for a photosemiconductor element which is used to detect sectors of a disk 54. The door accommodating portion 52 can receive the attaching portion 42 of the door 40, is formed with a notch 56 accommodating the coil spring 44, and provided in the interior of the notch 56 with a projection 57 holding the other end of the coil spring 44. The rotary frame 47 is attached by a pin rotatably to a housing (not shown) of the recording-reproducing device body and urged by means of a U-shaped spring (not shown) so that the door (40) section is raised from the face of the housing so as to assume a certain angle.

The open/close operation of the door 40 will then be described. The door 40 attached to the rotary frame 47 is urged always in the direction of the arrow A by means of the coil spring 44, and the rotary frame 47 is given the turning force of the direction of the arrow B by the action of the U-shaped spring. In the open state of the door 40 shown in FIG. 5(b), as the control portion 41 is pushed downward in the direction of the arrow C in opposition to the strength of the U-shaped spring, the projections 43 of the control portion 41 move along the back face of a front panel 58, and the attaching portion 42 of the door 40 comes gradually into the door accommodating portion 52 of the rotary frame 47 in opposition to the strength of the coil spring 44. When the projections 43 of the control portion 41 come to the position of a notch 59 on the back face of the front panel 58, the door 40 moves in the direction of the arrow A due to the action of the coil spring 44 and the projections 43 come into engagement with the notch 59, whereby the rotary frame 47 is maintained in the thus attained engaged state. In the state shown in FIG. 5(a), as the control portion 41 of the door 40 is pushed rearward, the projections 43 disengage from the notch 59 and the rotary frame 47 turns in the direction of the arrow B due to the action of the U-shaped spring, whereby the state shown in FIG. 5(b) is recovered. Through repetition of the foregoing operation the door is opened and closed.

According to the foregoing prior art, the door 40, which is always urged frontward by means of the coil spring 44 and upward by means of the U-shaped spring, is abutting on the front panel 58 attached to the housing and pushing the front panel 58; thus, the conventional configuration has the drawback in view of long-term service that the front panel 58 tends to slip from a given attaching position on the housing or the same made of synthetic resin etc. tends to deform.

SUMMARY OF THE INVENTION

It is an object of the present invention to make a door open/close mechanism independent of a housing and front panel thereby to improve and ensure the preciseness of attaching portion of the front panel with respect to the housing over a long term and eliminate deformation thereof.

To achieve the foregoing object, the present invention provides a disk recording-reproducing device of the type wherein in response to open/close action of a door (3) the clamp operation against a disk is commenced, which is characterized by a door plate (18) provided on its front end with the door (3) and urged toward the door (3), a rotary frame (19) supporting slidably the door plate (18) and urged rotatingly in the open direction of the door (3), and a lock plate (23) formed with a notch engagable with a lock portion (18b) provided on the door plate (18) at the close time of the door (3) and urged in the engaging direction.

DESCRIPTION OF THE PREFERRED EMBODIMENT

Figure 1:
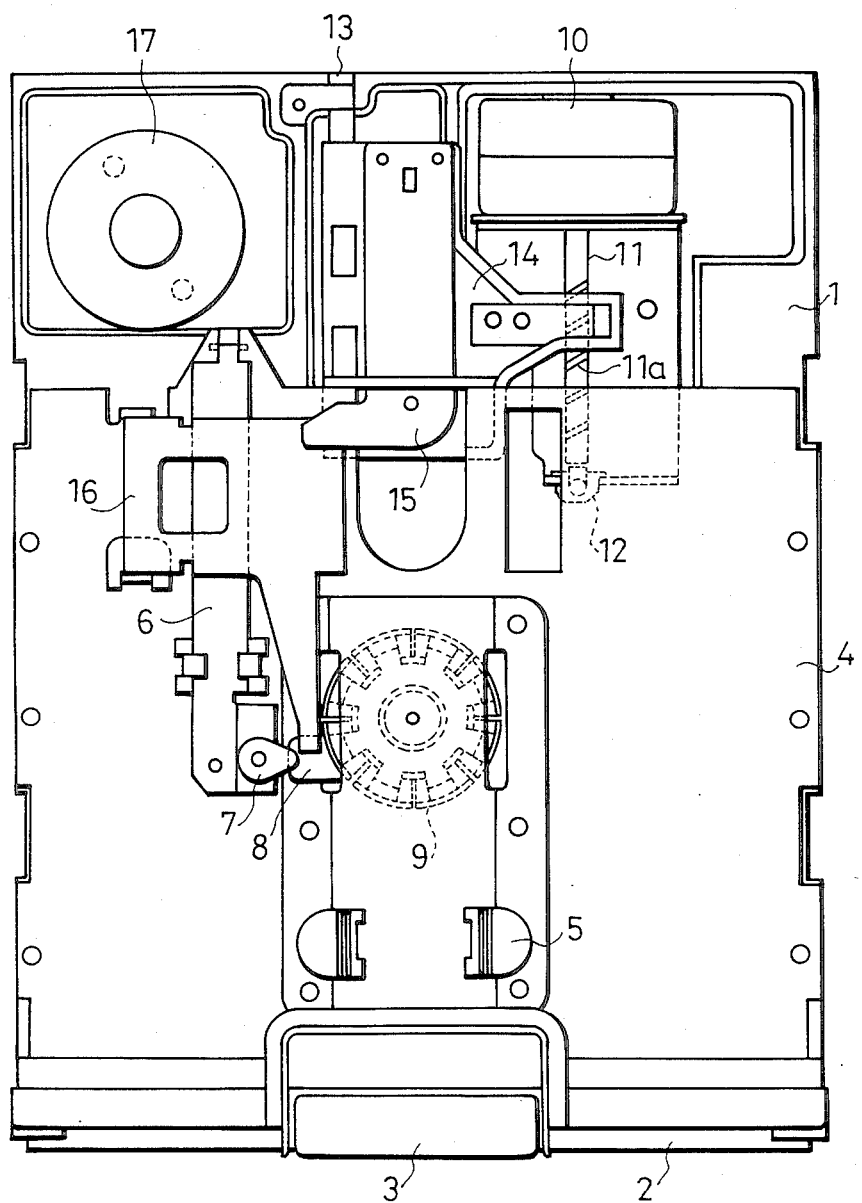
FIG. 1 is a plan view showing an embodiment of disk recording-reproducing device according to the present invention.

The present invention will now be described in detail with reference to its embodiment shown in the drawings. FIG. 1 is the plan view showing the embodiment of a disk recording-reproducing device according to the present invention. In this drawing, reference numeral 1 indicates a housing formed by aluminum-die casting etc., 2 indicates a front panel made of synthetic resin and secured in front of the housing 1, 3 indicates a door to open/close an insertion opening for a disk, and 4 indicates a lever frame attached to the upper face of the housing 1. An open/close mechanism of the door 3 is accommodated in a hollow portion 5 provided in the vicinity of the center of the lever frame 4. 6 indicates an eject board provided slidably on the upper face of the lever frame 4 for ejecting the disk, 7 indicates a cam abutable on a release plate 8 forming a part of a clamp arm (see FIGS. 2 and 3) making in turn the door open/close mechanism, which cam is provided at an upper portion of the front end of the eject board 6, and 9 indicates a hub for clamping the disk attached rotatably to the lever frame 4 inside the hollow portion 5. 10 indicates a stepping motor secured on the right-hand side of the rear end of the housing 1, and 11 indicates a screw shaft formed with a groove 11a, which is attached to the stepping motor 10 and whose one end is supported rotatably by a bearing 12 of the ball bearing type. 13 indicates a guide shaft secured to the housing 1, 14 indicates a carriage mounting thereon a magnetic head (not shown) for read/write of information, and 15 indicates an arm which is held at one end pivotably by an upper portion of the carriage 14, urged by a spring toward the carriage 14, and provided with a pad (not shown) for pushing the disk at the time of clamping. In the groove 11a of the screw shaft 11 an engage segment (not shown) attached to the carriage 14 is fitting, so that as the stepping motor 10 is caused to rotate a given number of steps, the engage segment, namely, the carriage 14 is shifted along the guide shaft 13 by a distance corresponding to the extent of revolution of the screw shaft 11. Further, 16 indicates an arm supporting plate which is supported by the release plate 8 at the time of unclamping the disk to lift the arm 15, and 17 indicates a drive motor for rotating the disk.

Figure 2:
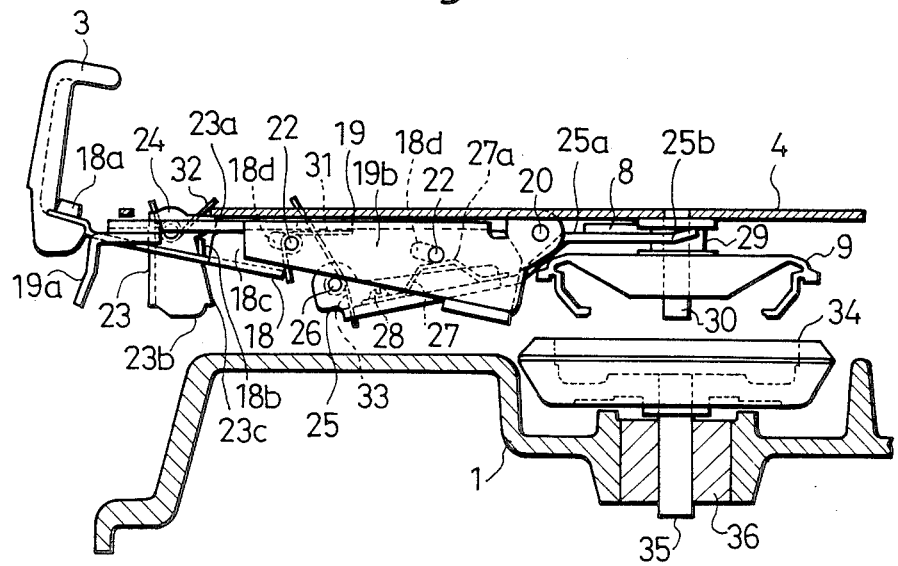
FIGS. 2 and 3 are side views showing a door open/close and clamp mechanism of the embodiment, with portions broken away.
Figure 3:
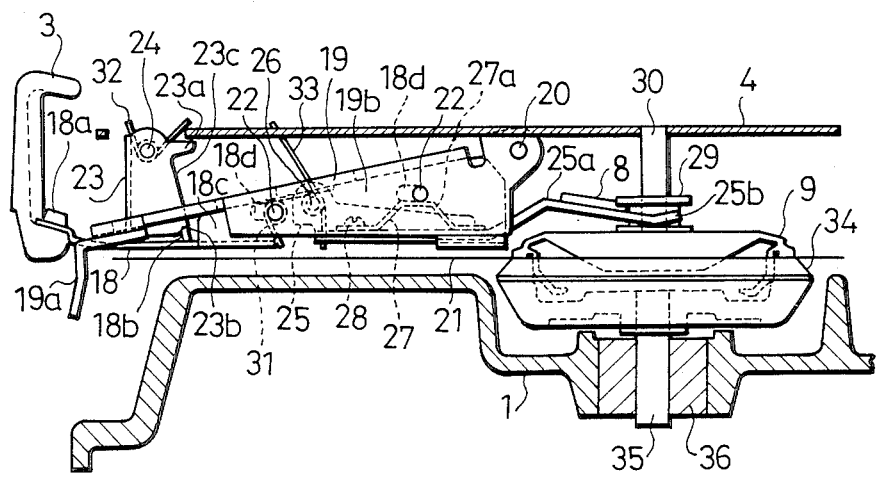
Figure 4:
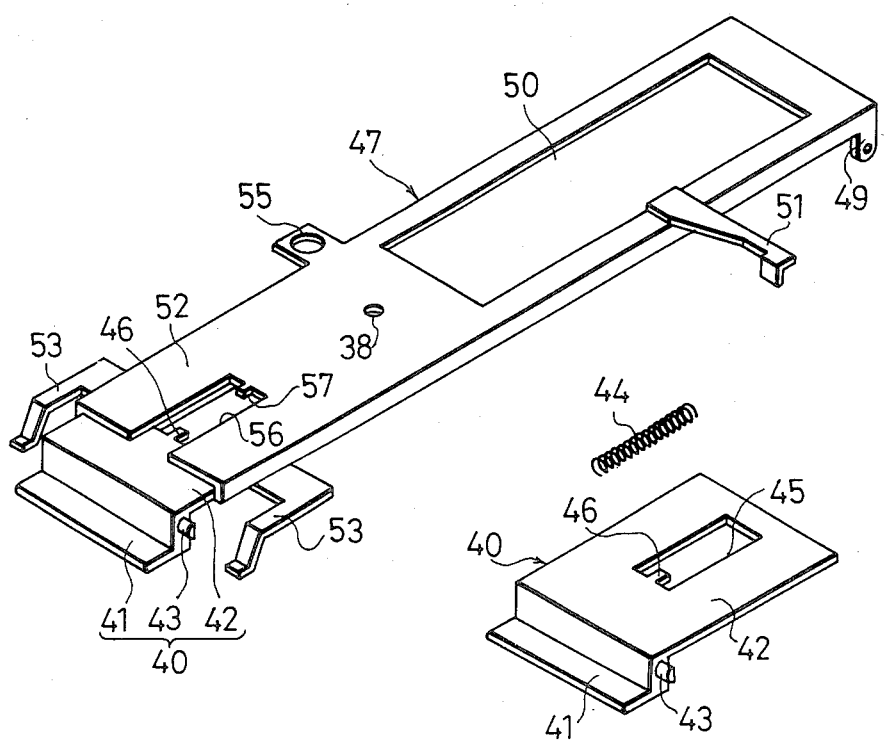
FIG. 4 is a perspective view showing a rotary frame etc. of the conventional device.
Figure 5A:
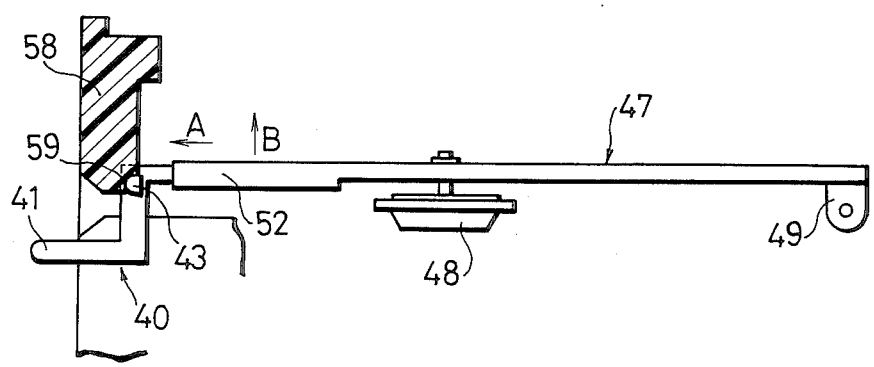
FIGS. 5(a) and (b) are side views of the important portion for explanation of the door open/close operation of the conventional device.
Figure 5B:
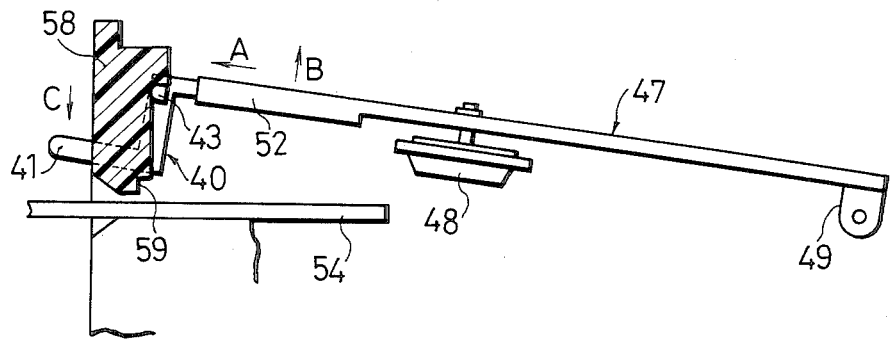

The configuration of the door open/close mechanism and disk clamp mechanism will then be described. FIGS. 2 and 3 are the side views showing the door open/close mechanism and clamp mechanism of the embodiment, with portions broken away. 18 indicates a door plate supporting the door 3 screwed to its front end portion 18a. The door plate 18 has, in a portion along about its center line and somewhat close to the front end, a lock portion 18b formed by cutting and bending upward a portion of the bottom, and slots 18d, 18d, . . . bored in wall faces 18c, 18c erecting vertically from both side margins of the door plate 18. 19 indicates a rotary frame supported at its rear end rotatably about a shaft 20 by the lever frame 4. The front end of the rotary frame 19 has block plates 19a, 19a hanging down from both sides for preventing ejection of a disk 21. Two shafts 22, 22 penetrating wall faces 19b, 19b extending vertically downward from both side margins of the rotary frame 19 pass through the slots 18d, 18d, . . . of the door plate 18 and are suppported thereby slidably in the lengthwise direction of the slots 18d, 18d, . . . 23 indicates a lock plate supported at its upper end rotatably about a shaft 24 by the lever frame 4, which has at its upper end a stop portion 23a abutable on the lever frame 4 and in its lower end a notch 23b engagable with the lock portion 18b of the door plate 18. 25 indicates a clamp arm supported at its front end rotatably about a shaft 26 by the lever frame 4, which has an arm portion 25a extending rearward and forming a single body with the release plate 8. On the bottom face of the clamp arm 25 a leaf spring 27 is secured at one end by a screw 28, the upper face of whose shaft portion 27a abuts on the under face of the shaft 22. The point 25b of the arm portion 25a of the clamp arm 25 abuts on a bearing 29 secured on the hub 9 and acts so as to move vertically the hub 9 along a clamp shaft 30. 31 indicates a slide spring provided around the shaft 22 for urging the door plate 18 toward the door 3 relatively with respect to the rotary frame 19, 32 indicates a lock spring provided around the shaft 24 for urging the lock plate 23 so as to turn in the counterclockwise direction about the shaft 24, and 33 indicates a lift spring provided around the shaft 26 for urging the clamp arm 25 so as to turn in the counterclockwise direction about the shaft 26, that is, the rotary frame 19 and door plate 18 are urged in the direction of opening the door 3 via the leaf spring 27 and shaft 22. 34 indicates a spindle for supporting and rotating the disk 21 about a spindle shaft 35, and 36 is a bearing provided between the housing 1 and the spindle shaft 35.

The operation of the thus configured door open/close mechanism and disk clamp mechanism will then be described. FIG. 2 illustrates the state wherein the door 3 is opened and the hub 9 is lifted by the clamp arm 25. In this state, as the door 3 is pushed down in opposition to the strength of the lift spring 33, the rotary frame 19 supporting the door plate 18 turns in the counterclockwise direction about the shaft 20, as a result, the shaft 22 pushes the leaf spring 27 downward, and the clamp arm 25 to which the leaf spring 27 is attached moves the hub 9 downward along the shaft 30. At this time, the lock portion 18b of the door plate 18 slides on an inclined face 23c of the lock plate 23, and the lock plate 23 being pushed by the lock portion 18b turns a little in the clockwise direction about the shaft 24. Then, as the lock portion 18b comes up to the position of the notch 23b, the lock plate 23 turns in the counterclockwise direction due to the action of the lock spring 32 and the lock portion 18b comes to engagement with the notch 23b. At this moment, the stop portion 23a is spaced a little from the lever frame 4. The reason is that by providing a spacing between the stop portion 23a and the lever frame 4 the engagement between the lock portion 18b and the notch 23b is ensured and can not be loosened even if a shock is given from the external. Through the foregoing manner of operation, as shown in FIG. 3, the disk 21 is pinched between the hub 9 and the spindle 34, and the door plate 18 and lock plate 23 are locked mutually, whereby the door closing and clamping operation is completed.

In the state shown in FIG. 3, as the door 3 is pushed rearward in opposition to the strength of the slide spring 31, the door plate 18 moves rearward relatively with respect to the rotary frame 19. At this time, the lock plate 23 turns in the counterclockwise direction about the shaft 24 due to the action of the lock spring 32; but, as the upper face of the stop portion 23a abuts on the under face of the lever frame 4, a further rotation of the lock plate is blocked. As the door 3 is further pushed into, the engagement between the lock portion 18b and the notch 23b is broken, the clamp arm 25 turns in the counterclockwise direction about the shaft 26 due to the action of the lift spring 33, and the rotary frame 19 and door plate 18 supported by the former are lifted by means of the leaf spring 27 provided on the clamp arm 25 and the shaft 22. At this time, the hub 9 is also moved up by means of the arm portion 25a of the clamp arm 25, and the pinched state of the disk 21 between the hub and the spindle 34 is released. Through the foregoing manner of operation, as shown in FIG. 2, the door 3 and hub 9 are held in the lifted state and the door opening and unclamping operation is completed.

Summarizing the foregoing operation, in the state shown in FIG. 2 wherein the door 3 is opened, as the door 3 is pushed downward in opposition to the strength of the lift spring 33, the lock portion 18b of the door plate 18 slides on the inclined face 23c of the lock plate 23. As the lock portion comes to the position of the notch 23b of the lock plate 23, the lock plate 23 turns in the counterclockwise direction due to the action of the lock spring 32, the lock portion 18b fits in the notch 23b, and the door plate 18 is held in the engaged state.

In the state shown in FIG. 3, as the door 3 is pushed rearward in opposition to the strength of the slide spring 31, the door plate 18 moves rearward relatively with respect to the rotary frame 19, and the engagement between the lock portion 18b and the notch 23b is broken. As a result, the rotary frame 19 is lifted by the action of the lift spring 33, and the door plate 18 supported by the rotary frame 19 and the door 3 move up, whereby the state shown in FIG. 2 is recovered. Through repetition of the foregoing operation the door 3 is opened and closed.

For reference, because the strength of the lift spring 33 and/or leaf spring 27 for lifting the door 3 etc. becomes weak as the door plate 18 moves up, it is preferable to design the lock plate 18b and inclined face 23c so as to give as small a sliding resistance as possible.

In this connection, it is also preferable to scrape inward an upper portion of the inclined face 23c of the lock plate 23 thereby to make the lock portion 18b separate from the inclined face 23c in about a second half portion of the upward movement of the door plate 18.

As is apparent from the foregoing description, according to the present invention, the door open/close mechanism is accommodated in the hollow portion of the lever frame independent of the housing and front panel, so that a force caused by door opening and locking is not applied unduly to the front panel; thus, the present invention produces the effects that the preciseness of attaching position of the front panel with respect to the housing over a long term is improved and ensured and no deformation of the front panel due to a pushing force appears.

What is claimed is:

1. A door opening and closing mechanism for a disk recording and reproducing apparatus having a housing provided with a front panel having an insertion slot for insertion and removal of a disk horizontally therethrough into and from the housing, a door in front of the insertion slot which is movable upwardly for opening and downwardly for closing the slot in conjunction with insertion and removal of a disk therethrough, and a disk clamping mechanism within the housing having a clamp member connected to a longitudinally extending pivotable frame which is pivotably mounted at one end within the housing and supports the door toward its other end for upward movement to open and downward movement to close the door in conjunction with upwardly unclamping and downwardly clamping the clamp member with respect to a disk on a turntable in the housing for recording and reproducing operations, wherein said improved door opening and closing mechanism comprises:

a longitudinally extending door plate (18) having said door fixedly mounted to one end (18a) and having its other end (18c) slidably mounted to said other end of said pivotable frame (19) for horizontal sliding movement relative to said other end of said frame when said door is pushed horizontally toward the rear of said housing, said door plate having a lock projection (18b) formed at a position between its ends, and being movably upwardly and downwardly with said other end of said pivotable frame for opening and closing the door;

first biasing means (31) for biasing said door plate outwardly toward the front of said housing;

a lock plate pivotably mounted in said housing at an intermediate position between said door and said clamp member behind said front panel, having a stop portion (23a) which is abutable with a fixed portion of said housing for preventing rotation of said lock plate in one direction, second biasing means (32) for biasing said lock plate in said one direction toward abutment with the fixed portion of said housing, and an inclined face (23c) slidably engaged with said lock projection of said door plate between an abutting surface (23a) at an upper end and a notch (23b) on a lower end, wherein said lock projection becomes abutted on said abutting surface limiting its upward travel when said pivotable frame and door plate are moved upward upon opening said door, said lock projection slides downwardly on said inclined face against the biasing force of said second biasing means when said door is closed and said pivotable frame and door plate are moved downward, said lock projection is held in said notch to hold said door closed in conjunction with said pivotable frame and clamp member clamping a disk on the turntable, and said lock projection is released from said notch to move slidably upward on said inclined face against the biasing force when said door is pushed horizontally rearward to open said door and unclamp the disk.

* * * * *